United States Patent
Botros et al.

(10) Patent No.: US 7,037,973 B2
(45) Date of Patent: May 2, 2006

(54) HIGHLY VISCOUS COATING MATERIAL FOR POROUS SUBSTRATES

(75) Inventors: Raouf Botros, Centerville, OH (US); Randolph W. Spratt, Fairborn, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/893,938

(22) Filed: Jun. 27, 2001

(65) Prior Publication Data

US 2003/0018101 A1 Jan. 23, 2003

(51) Int. Cl.
*C08L 39/00* (2006.01)
*C08L 71/02* (2006.01)

(52) U.S. Cl. ...................... 524/555; 524/612

(58) Field of Classification Search ................ 523/160, 523/161; 524/555, 612
See application file for complete search history.

(56) References Cited

U.S. PATENT DOCUMENTS

| | | | |
|---|---|---|---|
| 4,150,997 A * | 4/1979 | Hayes ..................... 106/15.05 |
| 4,476,031 A * | 10/1984 | Ooms ......................... 510/522 |
| 4,838,940 A * | 6/1989 | Kan et al. ................. 106/31.13 |
| 5,352,283 A * | 10/1994 | Beach et al. ............. 106/31.43 |
| 5,730,789 A * | 3/1998 | Botros ...................... 106/31.43 |
| 5,958,999 A * | 9/1999 | Bates et al. ................. 523/161 |
| 5,990,201 A * | 11/1999 | Miyazaki et al. ........... 523/161 |
| 6,011,098 A * | 1/2000 | Kashiwazaki et al. ...... 524/377 |
| 6,100,315 A * | 8/2000 | Kitamura et al. ........... 523/160 |
| 6,258,873 B1 * | 7/2001 | Gundlach et al. ........... 523/160 |
| 6,280,512 B1 * | 8/2001 | Botros ..................... 106/31.43 |
| 6,323,257 B1 * | 11/2001 | Moffatt et al. .............. 523/160 |

* cited by examiner

*Primary Examiner*—Callie Shosho
(74) *Attorney, Agent, or Firm*—William R. Zimmerli

(57) ABSTRACT

A coating composition for application on a porous substrate for use with a roller printing application. The coating composition comprises an ethoxylated polyethyleneimine polymer, a pH modifier, a thickening additive, an ammonium sulfate, a surfactant, and water. Optional additives can comprise a biocide, a lower aliphatic alcohol and a UV fluorescent dye. When the coating composition is applied to the porous substrate, waterfast prints are produced which are resistant to smudging or bleeding when subjected to moisture. The coating composition can be applied to the porous substrate as a pre-print coating or a post-print coating.

9 Claims, No Drawings

HIGHLY VISCOUS COATING MATERIAL FOR POROUS SUBSTRATES

TECHNICAL FIELD

The present invention relates to ink jet printing and, more particularly, to the application of black and color inks to a coating fluid for a substrate for achieving enhancement in permanence and image quality.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

Achieving improvement in permanence and darkness of ink jet print remains a top priority in the printing business. For ink jet business to grow in the graphic arts, textiles, lottery, business forms and publishing industries, significant improvement in water resistance and darkness of the image must be demonstrated.

Substrate manufacturers produce many ink-jet grade substrates using coated components. Coated components, such as amorphous and precipitated silicas, vary in particle sizes and their distribution. Multivalent cross linking, often cationic, components include specialty treated high-bulk oxides of metals such as aluminum, titanium, zirconium, lanthanum, magnesium; modified starches; water soluble polymeric binders, such as hydrolyzed PVA; and resins. Depending on the composition and methods of coating, such substrates yield varying degrees of dot gain, brightness, optical density, rate of absorption or drying, and water resistance of the ink-jetted image.

The use of hydroxyalkylated polyethyleneimine (EPI) in ink jet inks has been shown to significantly improve waterfastness of the inks. However, polymeric inks using EPI or other polymers to improve permanence of an image, do not run in the printer as well as non-polymeric inks, and require more frequent system maintenance. Furthermore, non-black inks achieve only modest improvement in water resistance with EPI, probably due to extreme solubility of the non-black color dyes.

A coating fluid comprising a solution of ethoxylated polyethyleneimine, a surfactant and an electrolyte, has been described and claimed in commonly assigned, co-pending, application Ser. No. 09/572,550. The fluid, when applied with an ink jet printhead to an imaged substrate, showed significant improvement in waterfastness even in the case of non-black images which are normally hard to fix due to their small molecular weight and extreme solubility.

While the coating fluid described and claimed in U.S. Pat. application Ser. No. 09/572,550, is particularly well suited in many ink jet applications, the coating fluid unfortunately has the consistency of water (viscosity~1.0 centipoise). Therefore, when the coating fluid is applied in a roller coater, results were not encouraging. The coating was heavy on the margins of the substrate, while the middle area was blotchy and non-uniform. This produced uneven images with poor waterfastness.

It is seen then that there is a need for an improved technique for achieving proper viscosity of the coating fluid for suitability in a roller application and finding a means to detect unevenness on a treated substrate.

SUMMARY OF THE INVENTION

This need is met by the coating composition according to the present invention, wherein enhancement in permanence of black and specialty non-black color ink jet prints is achieved. The polymer solution is applied to the substrate as a pre-coat or overcoat to the printed porous substrate. This has the advantage of allowing enough polymer to be used without adversely affecting the runnability of the ink. Furthermore, the coating material of the present invention produces color enhanced prints resistant to smudging and bleeding when subjected to moisture. The viscosity of the coating fluid is particularly suited for roller applications.

In accordance with one aspect of the present invention, a coating composition for application on a porous substrate for use with a roller application comprises an ethoxylated polyethyleneimine polymer, a pH modifier, a thickening additive, an ammonium sulfate, a surfactant, and water; Optional additives can comprise a biocide, a lower aliphatic alcohol and a UV fluorescent dye. When the coating composition is applied to the porous substrate, waterfast prints are produced which are resistant to smudging or bleeding when subjected to moisture.

Other objects and advantages of the invention will be apparent from the following description and the appended claims.

DETAILED DESCRIPTION OF THE INVENTION

The present invention proposes a coating composition for application on a porous substrate. The application may occur before or after printing, using any suitable application means such as spraying. The coating material is particularly advantageous for use on a porous substrate, including a textile-, paper- or pulp-based substrate. The substrate coating enhances the permanence of ink jet imaging on the substrate to produce waterfast prints resistant to smudging or bleeding even when subjected to moisture.

In accordance with the present invention, the viscosity of the coating composition is raised to 50–1000 cps without undermining the stability and effectiveness of the fluid, with a preferred range from 100–500 cps.

A coating composition made in accordance with the present invention may be manufactured as follows:

Preparation of Coating Fluid

EXAMPLE I

The following is one embodiment of a coating composition prepared in accordance with the present invention.

| Component | Weight % |
| --- | --- |
| Dimethylethanolamine | 0.10 |
| Thickening Additive | 0.50 |
| Ammonium Sulfate | 1.00 |
| Surfactant | 0.30 |
| 1,2-Benzisothiazoline-2-one (biocide) | 0.20 |
| UV fluorescent dye | 0.50 |
| Hydroxyalkylated polyethyleneimine | 5.00 |
| Deionized water | 92.40 |

When the coating composition was formulated as above in accordance with the present invention, the coating composition was applied to a printed porous substrate. The substrate was used to produce color enhanced prints, using a continuous ink jet printer, such as the type manufactured by Scitex Digital Printing, Inc., in Dayton, Ohio. The prints generated using the coating composition formulated in accordance herewith produced color enhanced prints resistant to smudging and bleeding when subjected to moisture.

To raise the viscosity of the coating fluid, solubility limitations cannot be reached before reaching the desired viscosity, as can occur when the additive is a starch or an algenic acid salt. Furthermore, it is desired that the process not be overly tedious, such as when any of a variety of polyvinyl alcohols (PVA) are used as the additives, the polyvinyl alcohols having average molecular weights between 10,000 and 186,000. Dissolving enough PVA crystals to reach even 30 cps would be a tedious process, requiring many hours of agitation and heating.

In accordance with the present invention, a thickening agent can be used to achieve the required viscosity. For example, by using 0.5% of a thickening additive in the coating formulation, a viscosity of 460 cps can be achieved. One possible thickening agent is carboxymethyl cellulose sodium salt. However, a coating fluid including carboxymethyl cellulose introduces an instability problem for the fluid, with the fluid separating into two layers in the course of a single day. If the thickening agent is anionic, like carboxymethyl cellulose sodium salt, the pH of the composition must be raised, which can affect the fixing ability of the coating. The present invention therefore identifies a class of thickening additives which provide the desired viscosity without interfering with the stability of the coating fluid. Preferred thickening additives that are commercially available, include, for example, Guar 8/22 or Guar 8/24, from Tic Gums, Inc. The amount of thickening additive used determines the final viscosity of the coating fluid. Typically, using up to 1.0% by weight of Guar provides all viscosity ranges required and a stable coating fluid which is very effective in providing near 100% waterfastness when applied to imaged substrates. Using 0.5% Guar in the above example gave a viscosity of 434 CPS. Using 0.3% and 0.6% of Guar gave viscosities of 55 and 940 CPS, respectively. Therefore, a range of 0.1% to 1.0% of a thickening agent, or combination of available thickening agents, is preferred.

The present invention also proposes raising pH of the fluid by adding N,N-dimethylethanolarnine (DMEA). The addition of DMEA had the effect of raising the pH of the fluid to 11. However, at such high pH, the waterfastness capability of the coating fluid dropped significantly. The dimethylethanolamine (DMEA) is used in this composition as a pH modifier to keep the pH of the coating fluid between 8.8 and 9.1. At a pH lower than 8.8, the polymer becomes less stable; while at a pH higher than 9.1, the polymer becomes less cationic, and will therefore have less tendency to interact with the anionic dye in the ink to get complete fixation of the image.

Using ammonium sulfate in the coating composition of the present invention has the advantage of increasing the cationic charge on the polymer by lowering the pH. This increases the tendency of the polymer to fix the anionic dye. In a preferred embodiment of the invention, the ammonium sulfate is present in an amount of about 0.5% to 5%.

The surfactant can be any nonionic, anionic, or cationic surfactant such as, for example, surfynol 465, surfynol TGE, and surfynol 104E. These exemplary surfynol products are based on acetylinic dioles chemistry and are commercially available from Air Products. The surfactant in the coating fluid enhances wetting of highly hydrophobic substrates.

The hydroxyalkylated polyethyleneimine (EPI) used for the coating composition is commercially available, such as the EPI from BASF under the trade name Lupasol SC-61B. In a preferred embodiment of the present invention, the EPI is present in the coating composition in an amount from about 0.5% to about 10% of 37% commercial strength.

The UV fluorescent dye of the coating composition may be any suitable commercially available dye, such as the commercially available Ciba Tinopal ABP-A liquid. The ultraviolet (UV) fluorescent dye can be present in the formulation to allow for visual inspection of the integrity of the coating layer under UV light. The (UV) fluorescent dye may be a modified stilbene disulfonic acid which is colorless on paper, but turns to a bright blue color under ultraviolet or "black" light.

Other additives that are optionally included in the vehicle of the present invention are a lower aliphatic alcohol from about 0–10% such as ethanol or IPA, and a biocide such as 1,2-Benzisothiazoline-2-one from about 0–0.3%. The balance of the composition is then comprised of deionized water.

An unexpected additional benefit to the coating fluid was observed with all inks on a variety of substrates. When the coating fluid was used as an overcoat, a significant enhancement in the color of the print was observed.

The following table illustrates the increase in optical density after overcoating with the coating fluid versus uncoated ink jet prints:

| Ink | Optical Density of Uncoated Print | Optical Density of Overcoated Print |
| --- | --- | --- |
| 1040 Black | 1.05 | 1.20 |
| 8090A Dark Blue | 1.14 | 1.21 |
| 1056 Blue | 0.45 | 0.53 |
| 8440 Magenta | 0.30 | 0.43 |
| 1060 Red | 0.30 | 0.40 |
| 1036 Black | 1.28 | 1.43 |

EXAMPLE 2

Furthermore, the coated prints of Example 2 showed near 100% permanence when soaked in water for one minute.

The table of Example 3 shows waterfastness results of four inks on a variety of imaged substrates, overcoated with the coating fluid of the present invention. The bracketed values represent waterfastness without applying the coating fluid.

EXAMPLE 3

| Substrate | Waterfastness % (1036 Black) | Waterfastness % (8000 Cyan) | Waterfastness % (8010 Magenta) | Waterfastness % (8020 Yellow) |
|---|---|---|---|---|
| Mead Escanaba Enamel #60 | 99 (43) | 98 (26) | 100 (46) | 100 (31) |
| Midland Multiweb Gloss #80 Text | 100 (40) | 93 (26) | 100 (34) | 100 (25) |
| Sterling Ultra #70 Web Gloss | 100 (51) | 100 (56) | 100 (70) | 100 (37) |
| Midland MPC Matte #70 Text | 100 (57) | 100 (33) | 100 (42) | 100 (28) |
| Champion Influence Soft Gloss #60 | 100 (46) | 100 (36) | 100 (49) | 100 (27) |
| Courtland Gloss #60 | 100 (39) | 100 (36) | 100 (49) | 100 (27) |
| Sterling Litho Gloss #60 | 99 (48) | 100 (30) | 100 (56) | 100 (29) |

The coating fluid of the present invention is suitable for ink jet print applied to any porous substrate, and is particularly suited for roller application. The coating fluid can be applied as a pre-coat or overcoat to a printed porous substrate, to produce color enhanced prints resistant to smudging and bleeding when subjected to moisture. The coating fluid can be applied with excellent results in enhancement and fixing of the print to any porous paper substrate, as well as to cotton or other fabric or textile substrates.

The coating solution may be applied by any suitable means, such as, for example, by spraying, roller arrangement, or application by a printhead positioned inline with the ink-applying printheads. When a printhead is used to apply the coating solution, the option exists of covering only the printed image area with the coating material, rather than the entire area of the substrate. After a post-coating application, the print can be dried, such as with a heat gun, to set the image.

Alternatively, the coating composition can be applied to the substrate prior to imaging, as a pre-coat fluid. Pre-coat application can provide the advantage of eliminating color-to-color bleed during imaging, since the dyes are fixed instantaneously as the ink contacts the pre-coated substrate. Furthermore, with pre-coating, images appear darker and have sharper edge definition, since the coating minimizes ink penetration and allows more fixed dyes on the surface. Finally, complete drying of the pre-coated substrate may not be necessary. Therefore, drying can be applied once after imaging, resulting in considerable savings in energy.

When the images are printed prior to application of the coating fluid, application of moisture to the print causes extreme bleed, to the point of almost complete color removal. However, when the coating solution of the present invention is applied to the ink jet prints, and then dried, the images are close to 100% permanent even when sprayed with water. Alternatively, the coating solution may be applied as a pre-print coat to the substrate, i.e., prior to imaging, with substantially equivalent results.

As will be obvious to anyone skilled in the art, the components that comprise the coating are commercially available and can be substituted with other commercially available equivalents. It is also understood and known in the art that waterfastness is dye specific, resulting in variations in the amount of waterfastness achieved, particularly when varying the inks being applied to the substrate, and varying the substrate itself. Almost all ink jet inks applied on a variety of commodity substrates give vastly varying image quality. Differences occur in optical density, brilliance, permanence, drying and dot resolution. The substrate coating composition of the present invention is particularly adaptable for printing permanent images using a roller application. Porous substrates and textile materials printed with direct dyes can be treated with the coating composition of the present invention. Direct dyes have very poor waterfastness on cellulosic fabrics. Treatment of the fabric with the coating solution of the present invention can produce fabrics with excellent waterfastness.

The invention has been described in detail with particular reference to certain preferred embodiments thereof, but it will be understood that modifications and variations can be effected within the spirit and scope of the invention.

What is claimed is:

1. A coating composition for application on an ink jet printable porous substrate prior to imaging the substrate for improving the waterfastness of the ink jet image comprising from 0.5% to 10% by weight based on a 100% weight basis of an ethoxylated polyethyleneimine polymer from 1% to 3% by weight of a pH modifier to maintain a pH on the printable porous substrate between 8.8 and 9.1, from 0.5% to 1% by weight of a thickening additive to provide a viscosity ranging from about 50 cps to about 1000 cps, from 0.5% to 5% by weight of an electrolyte, from 0.05% to 0.5% by weight of a surfactant, and water.

2. A coating composition as claimed in claim 1 wherein the surfactant is selected from the group consisting of nonionic, anionic and cationic surfactants.

3. A coating composition as claimed in claim 1 wherein the surfactant comprises 0.3% by weight.

4. A coating composition as claimed in claim 1 wherein the pH modifier comprises N,N-dimethylethanolamine.

5. A coating composition as claimed in claim 4 wherein the N,N-dimethylethanolamine comprises 2% by weight.

6. A coating composition as claimed in claim 1 wherein the electrolyte comprises ammonium sulfate.

7. A coating composition as claimed in claim 1 further comprising a lower aliphatic alcohol.

8. A coating composition as claimed in claim 1 further comprising a biocide.

9. A coating composition as claimed in claim 1 further comprising an ultraviolet fluorescent dye.

* * * * *